United States Patent [19]
Roberts

[11] 4,086,703
[45] May 2, 1978

[54] MICROMETER GAUGE

[76] Inventor: Aubrey Gene Roberts, 10500 Westminster Ave., #34, Garden Grove, Calif. 92643

[21] Appl. No.: 716,199

[22] Filed: Aug. 20, 1976

[51] Int. Cl.² ............................................. G01B 3/18
[52] U.S. Cl. .................................... 33/164 R; 33/167
[58] Field of Search ................. 33/167, 164 R, 180 R

[56] References Cited
U.S. PATENT DOCUMENTS 3,496,758  2/1970  Sunnen .................................. 33/167

Primary Examiner—Richard E. Aegerter
Assistant Examiner—Willis Little
Attorney, Agent, or Firm—Lawrence D. Sassone

[57] ABSTRACT

The invention is a gauge comprising a body, guide, micrometer head having a rod and an arm slidably coupled to the guide and to the micrometer rod. The arm in one version of the invention is coupled to a spring which holds the arm against the micrometer rod allowing precision settings to be made. Another version of the invention features a pivotable arm which helps prevent the arm from being damaged when the item to which the measurement is being made moves against the arm. An adjustment rod can also be used permitting two settings to be made for one part. The invention is utilized in measuring the distance on an item where a bend will be made on the item by a power brake.

5 Claims, 10 Drawing Figures

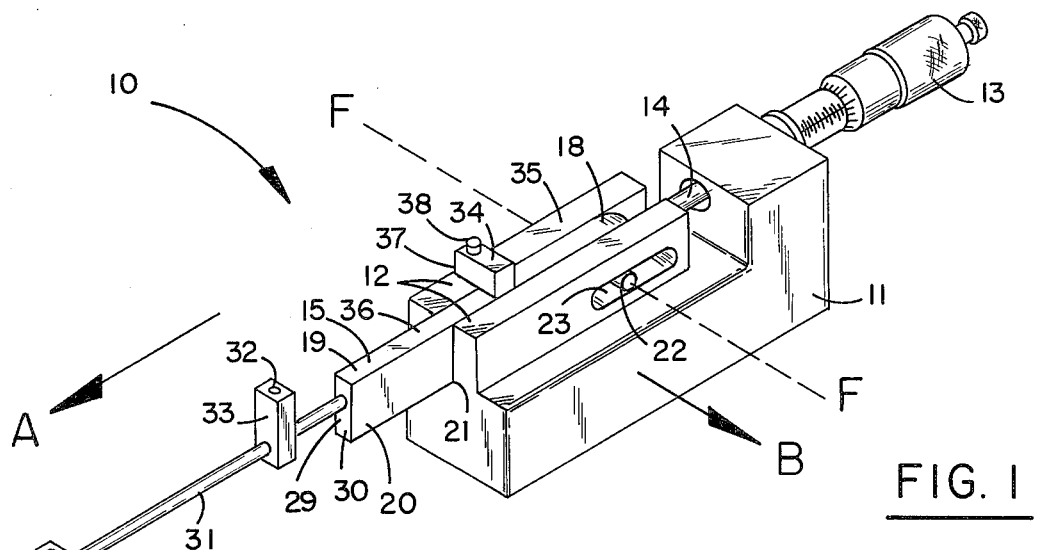
FIG. 1
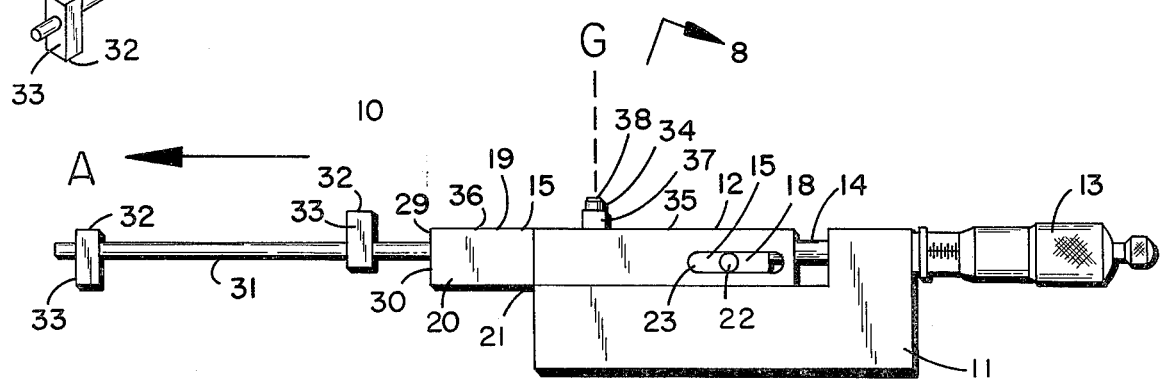
FIG. 2
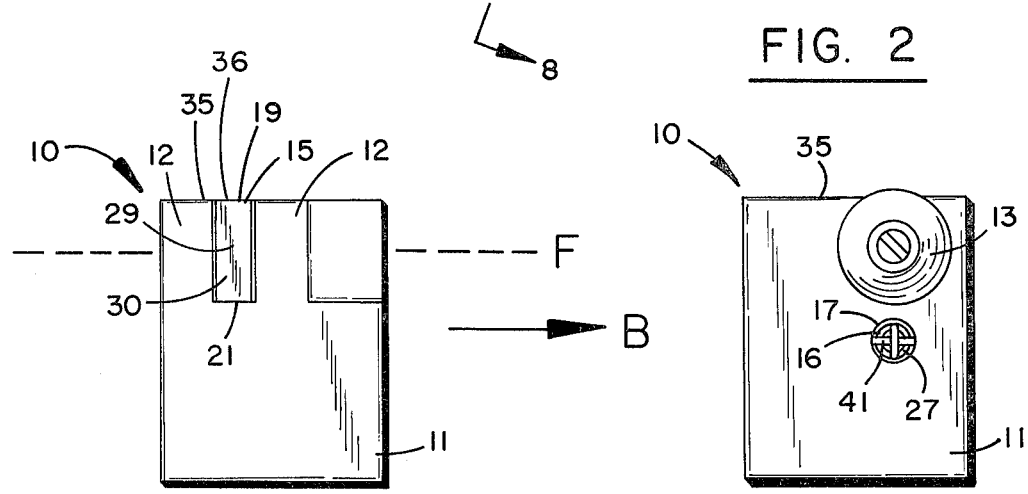
FIG. 3
FIG. 4

MICROMETER GAUGE

BACKGROUND OF THE INVENTION

Power brakes, power press brakes, press brakes, presses, punches, and shears usually perform an operation on a part such as an article being manufactured. One type of operation involves the bending of a flat sheet of metal to form a lip, flange and other shapes. This is usually accomplished by setting the metal sheet on a die having the desired shape then causing a ram having a pointed edge along its length to impact the metal sheet and push the metal sheet into the die thereby bending the metal sheet into the form of the die. A common case involves a V-shaped die and a ram having an edge with a long length that is centered above the middle of the V.

It is normally desired to place the bend in the part at a specified distance from the edge of the part. This may be done by measuring the distance from the edge of the part to the center of the die. In the past this measurement has been done by trial and error whereby the distance is visually estimated then the bend is placed in the part and then the location of the bend is measured after the bend has been made. If the bend is not in the right place, then the position of the part on the die is visually adjusted and the process is repeated until the bend is placed in the right spot. This procedure has the disadvantages of being inaccurate, unduly time consuming, waseful of parts, requires subjective estimations of distances, unsuitable for placing bend in correct spot on first attempt, and nonrepeatability, among others.

Another procedure involves measuring the distance from the center of the die to the edge of the part with a ruler or a measuring device of the desired length. This procedure has the disadvantage of being inaccurate and not being precisely repeatable, among others. Other procedures use reference bars which have the disadvantages of having to have to be removed prior to the operation on the part and inability to make multiple measurements at one time and require several experimental operations in order to produce the bend in the right place on the part.

SUMMARY OF THE INVENTION

The present invention relates to a micrometer guage which is used in connection with power brakes, power press brakes, press brakes, presses, punches and shears which perform an operation on a part, a typical example being placing a bend in a flat sheet of metal. It is an object of the present invention to provide a gauge that accurately measures the distance from the edge of a part to a reference point on a die. It is a further object of the invention to provide a gauge that will enable repeatable operations to be made yielding a bend in a part in the same place on the part. It is a further object of the invention to provide a gauge that can be set up one time and make multiple measurements and settings for multiple operations. It is still another object of the invention to provide a gauge that can be left in place during the operation without being damaged by the operation. It is a further object of the invention to enable various operations to be performed by an unskilled person as an operator and that repeatable operations be attainable.

The present invention is a gauge, comprising a body, a guide coupled to the body defining a first direction, a micrometer head having a micrometer rod coupled to the body so that the micrometer rod moves in substantially the same direction as the first direction and an arm slidably coupled to the guide and coupled to the micrometer rod, the arm slidable in the first direction.

In a preferred embodiment a spring is coupled to the body and to the arm and the body has a spring slot under the guide and the spring is a tension spring situated in the spring slot. In a preferred embodiment the arm has a rear portion which is pivotably coupled to the body wherein the arm has a front portion and a side wherein a rest is coupled to the body wherein the arm rests on the rest wherein a pin having a pin axis extends from the side of the arm from the rear portion of the arm wherein the pin axis is in a second direction which is substantially perpendicular to the first direction wherein the body has a slot having a length in the first direction and a height slightly larger than the height of the pin wherein the pin is positioned in the slot allowing the pin to move in the first direction and allowing the front portion of the arm to pivot up about the pin axis wherein the body has an arm channel under the rear portion of the arm capable of allowing part of the rear portion of the arm to pivot about the pin axis down into the arm channel.

In the preferred embodiment the body has a spring slot under the guide and the spring is a tension spring situated in the spring slot wherein the spring has a front end and a rear end and the front end is connected to the bottom of the arm at a point in front of and below the pin axis and the rear end is connected to the body at a point below and behind the pin axis and wherein the arm has a curved rear end which butts against the micrometer rod of the micrometer head and a front end having a flat surface.

In a preferred embodiment an adjustment rod is coupled to the front end of the arm and extends therefrom in the direction of the first direction.

Versatility and greater use of the invention is achieved wherein an adjustment rod is coupled to the front end of the arm and extends therefrom in the direction of the first direction wherein a block having a flat front surface is slidably coupled to the adjustment rod, the block slidable in the direction of the first direction wherein a plurality of blocks, each having a flat front surface, are each slidably coupled to the adjustment rod, each block slidable in the first direction. Additional versatility is achieved wherein an arm lock is coupled to the arm wherein the body has a top surface and the arm has a top surface wherein the arm lock comprises a plate and a screw having a screw axis perpendicular to the top surface of the body and to the top surface of the arm wherein the plate is rotatable about the screw axis when the screw is loose wherein the plate is rotatable over the top of the arm. It is also desirable that the micrometer head have locking means.

BRIEF DESCRIPTION OF THE DRAWINGS

FIG. 1 is a top perspective view of the micrometer gauge.

FIG. 2 is a side plan view of the embodiment shown in FIG. 1.

FIG. 3 is a front plan view of the embodiment shown in FIG. 1 with the adjustment rod removed.

FIG. 4 is a rear plan view of the embodiment shown in FIG. 1 with the adjustment rod removed.

DETAILED DESCRIPTION

Figure 5:
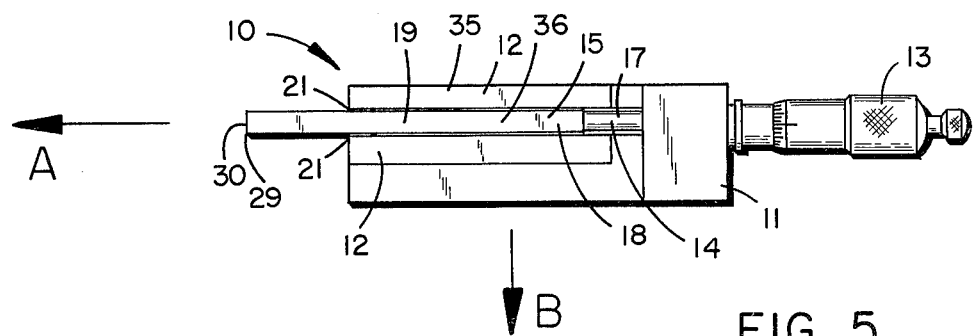
FIG. 5 is a top plan view of the embodiment shown in FIG. 1 with the adjustment rod removed.

Reference is now made to the accompanying drawings for a better understanding of the invention, wherein all the parts are numbered and various directions and axis are indicated by letters.

Figure 6:
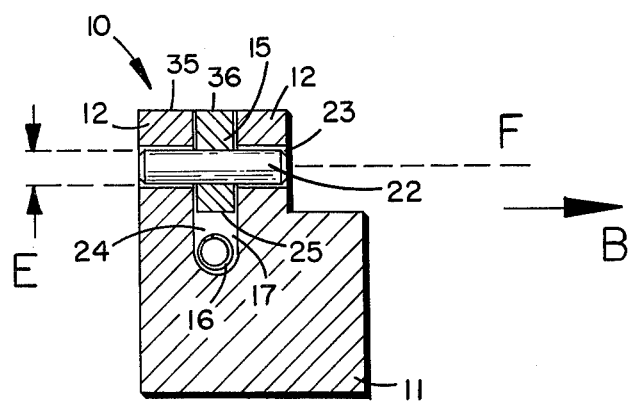
FIG. 6 is a cross-section view taken at the pin with the micrometer gauge situated as shown in FIG. 3.
Figure 10:
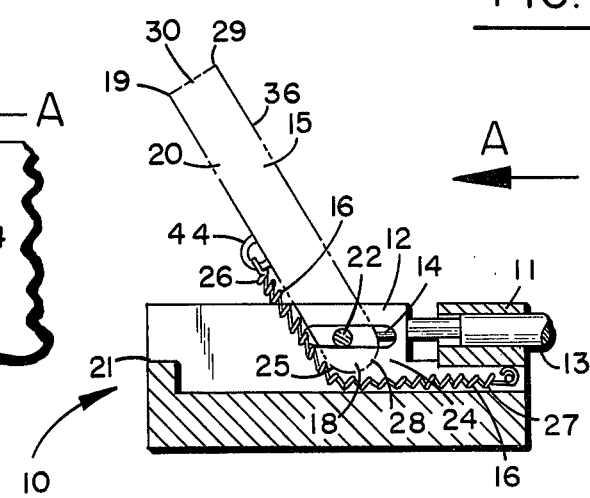
FIG. 10 is a side cross-section view of the body where the arm is situated wherein the arm is shown by phantom lines and the micrometer head is shown by a fragmentary view and the spring is illustrated.

In the embodiment shown in FIG. 1 a gauge 10 is indicated generally comprising a body 11, a guide 12 coupled to the body 11 defining a first direction A, a micrometer head 13 having a micrometer rod 14 coupled to the body 11 so that the micrometer rod 14 moves in substantially the same direction as the first direction, and an arm 15 is slidably coupled to the guide 12 and coupled to the micrometer rod 14, the arm 15 slidable in the first direction A. The body may be made of any suitable material such as wood, plastic or metal. It is preferred that the body be made of aluminum because aluminum is relatively light weight yet strong. The body 11 shown in FIG. 1 can be made by machining a solid block of aluminum. A rectangular cut can be placed through the block of aluminum and thereby form the guide 12. The micrometer head 13 is a standard item that can be readily purchased. The typical micrometer head 13 has a micrometer rod 14 and is capable of making measurements as little as 0.001 inch. It is preferred that the micrometer head 13 have locking means so that once the gauge is set it will not be disturbed or changed. In FIG. 1 the arm 15 is moved in the direction A by a typical micrometer 13 by rotating the outer part of the micrometer head 13 which results in movement of the micrometer rod 14 in the direction A or in the reverse direction. It is preferred that the arm 15 be coupled to the micrometer rod 14 by having the micrometer rod 14 make direct contact with the arm 15. Thus, as the micrometer rod 14 moves in the direction A it would force the arm 15 to also move in the direction A.

Where the micrometer rod 14 makes direct contact with the arm 15 the micrometer rod 14 will force the arm 15 to move in the direction A when the micrometer rod moves in the direction A. When the micrometer rod 14 is moved in the reverse direction, it is possible to put the arm with one's hand in the direction that is the reverse of A. This may be inconvenient and in a preferred embodiment a spring 16 is coupled to the body 11 and to the arm 15 in order to keep the arm 15 against the micrometer rod 14 when the micrometer rod 14 is moved in a direction that is the reverse of A. The spring 16 is shown in FIG. 4, 6 and 10.

It is a preferred embodiment that the body 11 have a spring slot 17 under the guide 12 and the spring 16 is a tension spring situated in a spring slot 17. A steel coil tension spring is adequate. In order to keep the arm 15 against the micrometer rod 14 it is preferred that the spring slot 17 be under the arm 15.

In a preferred embodiment the arm 15 has a rear portion 18 which is pivotably coupled to the body 11. It is further preferred that the arm 15 have a front portion 19 and a side 20 wherein a rest 21 is coupled to the body 11 wherein the arm 15 rests on the rest wherein a pin 22 having a pin axis F extends from the side 20 of the arm 15 from the rear portion 18 of the arm 15 wherein the pin axis F is in a second direction B which is substantially perpendicular to the first direction A wherein the body 11 has a slot 23 having a length C in the first direction A and a height D slightly larger than the height of the pin 22 wherein the pin 22 is positioned in the slot 23 allowing the pin 22 to move in the first direction A and allowing the front portion 19 of the arm 15 to pivot up about the pin axis F wherein the body 11 has an arm channel 24 under the rear portion 18 of the arm 15 capable of allowing part of the rear portion 18 of the arm 15 to pivot about the pin axis F down into the arm channel 24.

In a preferred embodiment the arm 15 is pivotable. When the micrometer gauge 10 is used with a power brake, not shown, it is desirable that the arm 15 be pivotable. A power brake, not shown, places a bend in a part such as a flat sheet of metal, not shown, and when it does so the part when it bends may rotate upward and strike the arm 15. This occurs when a part, not shown, that already is bent so that one part of it is horizontal and another portion of it is facing down in the vertical and it is desired to place another bend in the horizontal portion. Typically the downward vertical part would be placed against the arm 15 so as to measure the distance where the next bend would be placed in the part, not shown. Also typically the micrometer gauge 10 would be hard mounted in a position so that the measurement can be repeated without moving the micrometer gauge and thus when the second bend is made, the part would have a tendency to flip up and strike the arm 15 with a great force possibly damaging it and the micrometer gauge 10. However, if the arm 15 has the ability to pivot up as the part, not shown, is bending upward and exerting an upward force on the arm 15, then the arm 15 and the micrometer gauge 10 would not be damaged.

In a preferred embodiment the rest 21 keeps the arm 15 properly aligned by providing a contact point for a front portion 19 of the arm 15 thereby partially establishing what height the arm 15 will be aligned at. The arm 15 is supported also by the pin 22 at the rear portion 18 of the arm 15. The height of the arm 15 is determined by the height of the slot 23. It is preferred that the pin 22 extend from the rear portion 18 of the arm 15 so that there would not be very much of the arm 15 behind the pin 22 as it is desirable that as little of the arm 15 be pivoting down into the body 11.

Figure 7:
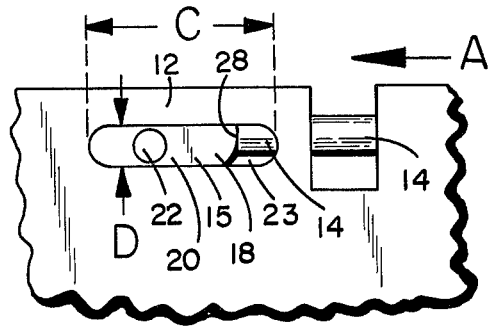
FIG. 7 is a fragmentary side plan view of the embodiment shown in FIG. 1 further illustrating the pin, arm and micrometer rod of the micrometer head.

By having a length C in the first direction A as shown in FIG. 7 the pin 22 will be able to move in the direction A and therefore the arm 15 will also be able to move in the direction A. The height D of the slot 23 as shown in FIG. 7 should be slightly larger than the height E of the pin 22 as shown in FIG. 6 to allow the pin to move in the direction A and to also rotate about the pin axis F. The pin 22 is positioned in the slot 23 so that the pin axis F is perpendicular to the direction A. Since the arm 15 pivots downward at its rear portion 18 it is necessary that there be a space for it to be able to pivot down into without striking anything and this is accomplished by having an arm channel 24 in the body 11 under the rear portion 18 of the arm 15.

Figure 9:
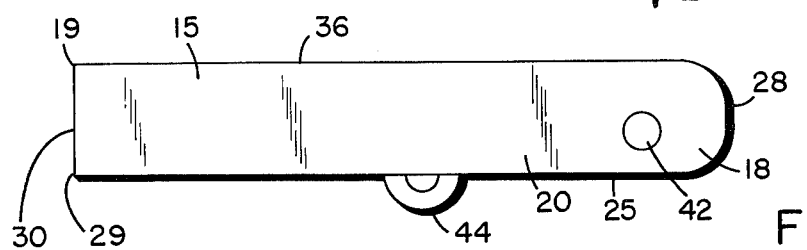
FIG. 9 is side plan view of the arm.

The arm 15 is illustrated by itself in FIG. 9. The embodiment of the arm 15 illustrated in FIG. 9 is a preferred embodiment where the arm has a curved rear end 28 which butts against the micrometer rod 14 of the micrometer head 13 and a front end 29 having a flat surface 30. The arm also has a top surface 36 and a bottom 25. Also illustrated in FIG. 9 is a hole 42 in the arm 15 for receiving the pin 22. The pin 22 may be loosibly coupled to the hole 42 of the arm 15 to facilitate installation and removal of the arm 15 in the body 11. Also illustrated in FIG. 9 is a hook 44 on the bottom 25 of the arm 15. The hook 44 should be placed forward of the pin axis F and not on the rear portion 18 of the arm 15 so that the spring 16, not shown in FIG. 9, will be able to pull the arm back down after the arm is forced up. Thus, in a preferred embodiment the body 11 has a spring slot 17 under the guide 12 and a spring 16 is a tension spring situated in the spring slot 17 wherein the spring 16 has a front end 26 and a rear end 27 and the front end 26 is connected to the bottom 25 of the arm 15 at a point in front of and below the pin axis F and the rear end 27 is connected to the body 11 at a point below and behind the pin axis F. The rear end 27 of the spring 16 may be connected to the body 11 by placing a spring pin 41 in the spring slot 17 at the rear of the body 11 and connecting the rear end 27 of the spring 16 to the spring pin 41 as shown in FIG. 4.

Greater versatility can be accomplished by coupling an adjustment rod 31 to the front end 29 of the arm 15 and it is preferred that the adjustment rod 31 extend therefrom in the direction of the first direction A as shown in FIG. 1 and FIG. 2. Micrometer rod 14 travel is usually limited on a micrometer head 13 and the adjustment rod can compensate for the travel limitations of the micrometer rod 14. It is further preferred that a block 32 having a flat front surface is slidably coupled to the adjustment rod 31, the block 32 slidable in the direction of the first direction A. It is further preferred that there be a plurality of blocks 32, each having a flat front surface 33, and each slidably coupled to the adjustment rod 31, each block 32 slidable in the direction of the first direction A. The blocks 32 are illustrated in FIG. 1 and 2. The adjustment rod 31 and blocks 32 permit several measurements to be made for one setting of the micrometer head 13. In particular where it is desired to bend a flat piece of metal, not shown, twice it is possible to adjust the blocks 32 for each of the two operations. For example a flat sheet of metal, not shown, could be placed against the block 32 closest to the arm 15 and then be bent which operation would not be interfered with by the other block 32 shown in FIG. 1 and FIG. 2 because it is rotated downward and a flat sheet of metal, not shown, would rest on top of the block 32 and its edge would butt against the other block 32 closest to the arm 15. However, after the first bend is placed in the part, not shown, one portion of the part would be lying in the horizontal and the other portion would be bent downward in the vertical and the vertical portion of the part would be placed against the block 32 furthest from the arm 15. The part could then be bent a second time without moving the micrometer gauge 10 or having to reset the micrometer head 13. As the second bend is placed in the part, not shown, the downward vertical portion of the part would be forced upward as the bend is put in the part thereby driving the part against the block 32 furthest from the arm and push the block 32 and the adjustment rod 31 and the arm 15 upward. This could damage the micrometer gauge 10 if the arm 15 were not pivotable. FIG. 3 illustrates the micrometer gauge without the blocks 32 and without the adjustment rod 31. FIG. 3 illustrates the front of the body 11 and the front end 29 of the arm 15 and the front flat surface 30 of the arm 15. The front surface of the arm 15 and the front surface of the blocks 32 should be flat so that a thin sheet of metal can be placed against the surface and an accurate measurement can be made each time and be repeatable. Also shown in FIG. 3 is the rest 21 which also acts as a bearing as the arm 15 is moved in the first direction A or the reverse thereof. The pin 22 also acts as a bearing as the arm 15 is moved in the first direction A or the reverse thereof as shown in FIG. 1 and FIG. 2 and FIG. 7.

FIG. 5 illustrates the embodiment that does not employ the adjustment rod 31 and shows the micrometer rod 14 aligned to the arm 15 and in the first direction A. FIG. 5 also illustrates that the arm is slidable in the first direction A and how the guide 12 defines the direction of movement of the arm 15 in the first direction A.

FIG. 6 is an illustration of a cross-section view of the gauge 10 with the gauge 10 positioned as shown in FIG. 3. FIG. 6 illustrates the spring slot 17 wherein the spring 16 is situated. The cross-section view is taken at approximately the position of the pin 22. Also illustrated is the arm channel 24 to allow the rear portion of the arm to pivot down when the front portion 19 of the arm 15 is forced upward.

Figure 8:
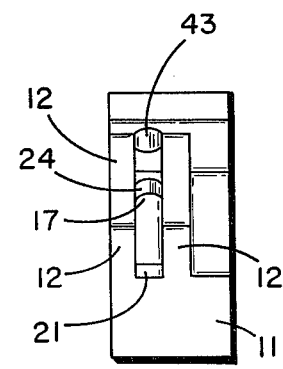
FIG. 8 is a front perspective view of the body of the micrometer gauge.

The body 11 and guide 12 are illustrated in FIG. 8. It is preferred that a block of aluminum be machined out by removing a portion of the block of aluminum so that the arm 15 could fit therein leaving walls on either side that form the guide 12. The micrometer head may be coupled to the body by machining out a micrometer hole 43 in the body 11. Since most micrometer heads 13 have a cylindrical shape at the attached point, the machine's micrometer hole should be circular. The micrometer head 13 may then be placed in the micrometer hole 43 and can be secured therein by a set screw, not shown, in the body. The rest 21 is shown in FIG. 8 as a flat surface at the front of the body 11. The spring slot 17 can be easily machined in the body by drilling a circular hole all the way through the body in the first direction A. The arm channel 24 can be created by machining the body 11 above the spring slot 17. This is illustrated further in FIG. 10 where the arm 15 shown by phantom lines is shown in the pivoted up position necessitating that there be an arm channel 24 so that the rear portion 18 of the arm 15 will not strike the body 11. The spring 16 is shown positioned directly underneath the arm 15. The curved rear end 28 of the arm 15 allows the arm 15 to rotate smoothly off of the micrometer rod 14. If the arm 15 had a flat rear end, then it would not allow the arm 15 to pivot because it would strike the micrometer rod 14. The curved rear end 28 of the arm 15 also functions as a bearing against the micrometer rod 14. FIG. 10 also illustrates the rest 21 that the arm rests on when it is in the nonpivoted position.

Under some conditions it may be desired that the embodiment featuring a pivotable arm 15 be locked in place. In such an embodiment an arm lock 34 is coupled to the arm 15 as shown in FIG. 1 and 2. An embodiment featuring the arm lock 34 can be fashioned wherein the body 11 has a top surface 35 and the arm 15 has a top surface 36 wherein the arm lock 34 comprises a plate 37 and a screw 38 having a screw axis G perpendicular to the top surface 35 of the body 11 and to the top surface 36 of the arm 15 wherein the plate 37 is rotatable about the screw axis G when the screw 38 is loose wherein plate 37 is rotatable over the top 36 of the arm 15. It is further desirable that the micrometer head be of the type that has locking means so that the setting of the micrometer would not be disturbed accidentally.

In the embodiment employing a adjustment rod 31 as shown in FIG. 1 and 2 the adjustment rod 31 may be threaded and the arm 15 may be bored to accept the adjustment rod 31 and facilitate installation and removal of the adjustment rod if it has the capacity to be screwed in or screwed out.

As stated heretofore the body 11 may be made of any suitable material but it is preferred that it be aluminum. It is preferred that the pin 22 be a steel pin so that it will withstand the frictional forces it will encounter. The arm 15 may be of a variety of material such as platic, wood or metal, but it is preferred that it be of metal to withstand the forces it will be subjected to. It is preferred that the micrometer head selected have a micrometer rod that is metallic so that the micrometer rod will act as a bearing as it rotates against the curved rear end 28 of the arm 15.

The gauge may be mounted to a apparatus suitable for the particular measurement to be made. A clamp can be fashioned for the front and a clamp can be fashioned for the rear of the gauge so that the gauge may more easily be bolted down to a given apparatus. The gauge will have greater flexibility if it can be slidably mounted by the use of clamps, not shown, and a metal bar, not shown, to which the clamps can clamp down on. In turn the metal bar, not shown, may be directly fastened to a power brake or press, not shown, so that measurement can be made from a fixed point on the power brake or press.

It is to be understood that the invention is not limited to the exact details of construction, operation, or the exact materials or embodiment shown and described, as obvious modifications and equivalents will be apparent to one skilled in the art, and the invention is therefore to be limited only by the scope of the appended claims.

I claim:

1. A gauge, comprising:
    a body having an arm channel and a slot having a length in a first direction;
    a rest coupled to the body;
    a guide coupled to the body defining a first direction;
    a micrometer head having a micrometer rod coupled to the body so that the micrometer rod moves in substantially the same direction as the first direction;
    an arm having a front portion, a rear portion and a side slidably coupled to the guide and coupled to the micrometer rod, the arm slidable in the first direction, the rear portion being pivotably coupled to the body, wherein the arm rests on the rest, the arm further having a curved rear end which butts against the micrometer rod of the micrometer head, the arm further having a front end having a flat surface;
    a pin having a pin axis extending from the side of the arm from the rear portion of the arm, wherein the pin axis is in a second direction which is substantially perpendicular to the first direction, wherein the height of the slot of the body is slightly larger than the height of the pin, wherein the pin is positioned in the slot allowing the pin to move in the first direction and allowing the front portion of the arm to pivot up about the pin axis wherein the arm channel of the body is under the rear portion of the arm and is capable of allowing part of the rear portion of the arm to pivot about the pin axis down into the arm channel;
    an adjustment rod coupled to the front end of the arm and extending therefrom in the direction of the first direction; and
    a block having a flat front surface slidably coupled to the adjustment rod, the block slidable in the direction of the first direction.

2. The invention as claimed in claim 1 wherein a spring is coupled to the body and to the arm so that the spring exerts a force on the arm in a direction opposite to the first direction.

3. The invention as claimed in claim 2 wherein the body has a spring slot under the guide and the spring is a tension spring situated in the spring slot.

4. The invention as claimed in claim 2 wherein the body has a spring slot under the guide and the spring is a tension spring situated in the spring slot wherein the spring has a front end and a rear end and the front end is connected to the bottom of the arm at a point in front of and below the pin axis and the rear end is connected to the body at a point below and behind the pin axis.

5. A gauge, comprising:
    a body having an arm channel and a slot having a length in a first direction;
    a rest coupled to the body;
    a guide coupled to the body defining a first direction;
    a micrometer head having a micrometer rod coupled to the body so that the micrometer rod moves in substantially the same direction as the first direction;
    an arm having a front portion, a rear portion and a side slidably coupled to the guide and coupled to the micrometer rod, the arm slidable in the first direction, the rear portion being pivotably coupled to the body, wherein the arm rests on the rest, the arm further having a curved rear end which butts against the micrometer rod of the micrometer head, the arm further having a front end having a flat surface;
    a pin having a pin axis extending from the side of the arm from the rear portion of the arm, wherein the pin axis is in a second direction which is substantially perpendicular to the first direction, wherein the height of the slot of the body is slightly larger than the height of the pin, wherein the pin is positioned in the slot allowing the pin to move in the first direction and allowing the front portion of the arm to pivot up about the pin axis wherein the arm channel of the body is under the rear portion of the arm and is capable of allowing part of the rear portion of the arm to pivot about the pin axis down into the arm channel;
    an adjustment rod coupled to the front end of the arm and extending therefrom in the direction of the first direction; and
    a plurality of blocks, each having a flat front surface, each being slidably coupled to the adjustment rod and each block slidable in the direction of the first direction.

* * * * *